United States Patent
Wedekamp

(10) Patent No.: US 6,500,312 B2
(45) Date of Patent: *Dec. 31, 2002

(54) DEVICE AND METHOD FOR UV-IRRADIATION, ESPECIALLY FOR DISINFECTING, FLOWING LIQUIDS WITH REDUCED UV-TRANSMISSION

(75) Inventor: Horst Wedekamp, Herford (DE)

(73) Assignee: Wedeco AG, Dusseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,840

(22) Filed: Dec. 30, 1999

(65) Prior Publication Data

US 2002/0100679 A1 Aug. 1, 2002

(30) Foreign Application Priority Data

Dec. 30, 1998 (DE) .......................................... 198 60 530

(51) Int. Cl.$^7$ ............................. C07C 6/00; B01J 19/12; C02F 1/48
(52) U.S. Cl. .............................. 204/157.15; 422/186.3; 210/748
(58) Field of Search ................. 205/157.15; 422/186.3; 210/748

(56) References Cited

U.S. PATENT DOCUMENTS

| | | | |
|---|---|---|---|
| 4,296,066 A | * 10/1981 | Schenck | 422/186.3 |
| 4,482,809 A | 11/1984 | Maarschalkerweerd | |
| 4,757,205 A | 7/1988 | Latel et al. | |
| 5,019,256 A | 5/1991 | Ifill et al. | |
| 5,320,749 A | * 6/1994 | Mullen | 422/186.3 |
| 5,368,826 A | * 11/1994 | Weltz et al. | 210/748 |
| 5,660,719 A | * 8/1997 | Kurtz et al. | 422/186.3 |
| 5,937,266 A | * 8/1999 | Kadoya | 422/186.3 |
| 6,013,917 A | * 1/2000 | Ishiyama | 422/186.3 |
| 6,264,802 B1 | * 7/2001 | Kamrukov et al. | 204/157.15 |
| 6,312,589 B1 | * 11/2001 | Jarocki et al. | 210/103 |

FOREIGN PATENT DOCUMENTS

| | | |
|---|---|---|
| EP | 0 080 780 A1 | 8/1983 |
| EP | 0 249 450 A2 | 12/1987 |
| EP | 0 687 201 B1 | 2/1998 |

* cited by examiner

Primary Examiner—Nathan M. Nutter
Assistant Examiner—Thao Tran
(74) Attorney, Agent, or Firm—Woodbridge & Associates, PC; Richard C. Woodbridge; Charles Manero

(57) ABSTRACT

The invention relates to a device and method for UV irradiation of treated waste water. The device comprises a plurality of UV modules, each UV module being an immersed radiator that comprises a low-pressure mercury radiator surrounded by a round sheathing tube permeable to UV rays. Each UV module is assigned to an irradiation chamber of square cross-section, the midpoint of which is also the midpoint of the UV radiator. The distance between the UV modules is selected in such a way that the cross-sectional area of the irradiation chamber of each UV module is not more than ten times larger than the cross-sectional area of the UV module itself.

6 Claims, 2 Drawing Sheets

DEVICE AND METHOD FOR UV-IRRADIATION, ESPECIALLY FOR DISINFECTING, FLOWING LIQUIDS WITH REDUCED UV-TRANSMISSION

BACKGROUND OF THE INVENTION

1. Field of the Invention

The invention relates to a device and a method for UV irradiation, particularly for disinfection, of flowing liquids with reduced UV transmission. The device has one or more support frames with a plurality of UV modules, each of which contains a low-pressure mercury-vapour radiator. The UV modules are kept apart in substantially parallel manner by the support frames and extend in the direction of flow of the liquid, which is treated waste water in particular.

2. Summary of the Prior Art

Devices of this kind are used in particular in sewage treatment plants because nowadays the treated waste water from treatment plants increasingly frequently needs to be disinfected before being introduced into natural watercourses. For this purpose the waste water treated by the treatment plant is exposed to ultraviolet radiation (UV irradiation). The UV modules with low-pressure mercury-vapour radiators used for this generate ultraviolet rays in the wavelength range from approx. 200 nm to 300 nm with a maximum at 253.7 nm.

The UV modules are in the form of immersion UV radiators and each comprise a low-pressure mercury-vapour radiator which is surrounded by a sheathing tube permeable to UV radiation. Corresponding devices of the type described thus far for UV irradiation are known from documents EP 0687201, DE 3270676, U.S. Pat. Nos. 4,757,205, 5,019,256, 4,482,809, EP 0080780 and EP 0249450 for example.

In contrast to clean, unpolluted water, treated waste water which is to be disinfected exhibits greatly reduced UV transmission. It is normally in the range of 40% to 60% per 1 cm of layer thickness. This means that 40% –60% of the UV radiation applied is absorbed in a water layer 1 cm thick and the effective depth of penetration is restricted to only approx. 5 cm (by comparison, pure drinking water has a transmission in the range of approx. 90% to 98%, so that the absorption losses are only 2% to 10% per cm of layer thickness, which corresponds to a comparable effective depth of penetration of approx. 2 m to 2.5 m).

The consequence of poor UV transmission and low effective depth of penetration for UV radiation is that such media can only be irradiated effectively in relatively thin layer thicknesses, such as are found, for example, in the immediate circumferential vicinity of radiator sheathing tubes (UV modules).

In such applications, the UV dose required to kill microorganisms can only be applied with the traditional devices if the medium is in contact with the UV radiation for a fairly time, i.e. at low flow rates, because they are equipped with UV modules which have small cross-sections in relation to the irradiation chambers surrounding them on the one hand and have UV radiator sources with low radiation output on the other hand.

The traditional devices are equipped with UV modules which are approx. 1 to 1.5 m long, the low-pressure mercury-vapour radiators of which, with diameters of 15 to 25 mm maximum, generate UV emissions in output values of 0.18 to 0.66 W/cm of discharge length and the sheathing tubes of which do not exceed an external diameter of 33 mm maximum, the annular gap which is formed between the external diameter of the radiator tube and the internal diameter of the sheathing tube having a width of 2.5 mm maximum. The full radiation output of 0.66 W/cm of discharge length of the UV modules which are the most powerful and technically most advanced at the present time requires temperatures of the surrounding medium of more than 20° C. because of the low insulating effect of the small annular gap. Radiation outputs of 0.5 W/cm or 0.4 W/cm can only be achieved when medium temperatures of 15 to 20° C. and/or greater than 10° C. are maintained. Furthermore, the distances between the UV modules and hence the irradiation chambers which result are dimensioned in such a way that their volumes are approx. 12 to 16 times as large or larger than the volume of the UV modules (including UV radiators). Particularly high and reliable disinfection performances, i.e. disinfection performances which are not subject to substantial variations under the conventional transmission changes, cannot be guaranteed in practice with these ratios of variables.

SUMMARY OF THE INVENTION

The object of the present invention is therefore to render possible for such liquids a device for more effective, more reliable disinfection effects with shorter contact times, i.e. for larger quantities of waste water per unit of time at higher and turbulent flow rates.

Because there is assigned to each UV module an irradiation chamber of polygonal cross-section, the midpoint of which is the midpoint of the UV radiator at the same time and which, starting from the midpoint, extends as far as half the distance to the adjacent UV modules, the individual UV modules being arranged in such a way that the midpoints of a number of adjacent UV modules form the corner points of a polygon, the area of which corresponds to the sum of the cross-sectional area of a UV module and the cross-sectional area of the irradiation chamber of a UV module, and that the distance between the UV modules is selected in such a way that the cross-sectional area of the irradiation chamber of each UV module is not more than 10 times larger than the cross-sectional area of the UV module itself, the high energy density may be utilized preferentially to shorten the contact times, i.e. to increase the flow rates and/or throughputs.

Furthermore, practical experiments have surprisingly shown that with the same dimensions, the enlargement alone of the UV module diameter and the associated reduction of the irradiation chambers again leads to an increase and above all a stabilization of the disinfection effect. When disinfecting waste water it is of the utmost importance that no substantial variations in the disinfection effect take place during the typical changes in the UV transmission which are conventional in this case. Compliance with the following dimensions has proved to be particularly advantageous according to experience gained from extensive practical experiments:

Maximum ratio of the volumes of the UV modules to the volumes of the irradiation chambers at UV transmissions up to T(1 cm)=40%:

| for module diameter | 25–30 mm | 1:12 |
|---|---|---|
| | 30–35 mm | 1:11 |
| | 35–40 mm | 1:9 |

-continued

| | |
|---|---|
| 40–45 mm | 1:8 |
| 45–50 mm | 1:7 |

Annular gap width R as a function of the temperature of the medium:
0° C. to 10° C. R>4 mm
10° C. to 25° C. R>3 mm
UV radiator tube diameters and UV radiation outputs:
Ø15 to 20 mm–0.3 W/cm
Ø25 mm up to 0.6 W/cm
Ø32 mm up to 1.1 W/cm
Ø38 mm up to 1.3 W/cm.

In pursuance of this objective the UV modules are equipped with high-performance low-pressure mercury-vapour radiators which with radiator tube diameters in the range from 22 to 36 mm have radiation outputs of approx. 0.6 W to more than 1.1 W/cm of discharge quantity in the spectral range from 200 nm to 300 nm and hence generate greater irradiances at the surfaces of the sheathing tubes than have been possible hitherto.

In practical experiments it has surprisingly been shown that a higher disinfection effect can be achieved by an enlargement of the sheathing tube diameter and the accompanying reduction of the irradiation chambers.

The overall outcome to emerge from these measures is that in order to achieve at least equivalent or higher disinfection effects, the volumes of the irradiation chambers can be reduced from the currently conventional 12 to 18 times the volumes of the UV modules to 5 to 11 times and particularly to 7.5 to 10 times.

The distance between the UV modules is selected in such a way that the cross-section of the irradiation chamber which is produced for each UV module is not more than 16.5 times larger than the cross-section of the UV module for module diameters of 28 mm, not more than 14 times larger for module diameters of 45 mm and not more than 11.5 times larger for module diameters of 55 mm, and that the low-pressure mercury-vapour radiators of the UV modules have a radiation output of at least 0.55 W/cm of discharge length in the spectral range of 200–300 nm and that irradiances of at least 60 mW/cm2 for 28 mm, at least 50 mW/cm2 for 35 mm, at least 38 mW/cm2 for 45 mm and at least 30 mW/cm2 for 55 mm result.

Preferably the cross-section of the irradiation chamber of a UV module is not more than 7.5 times larger than the cross-section of the UV module itself.

The object of the present invention is also to provide a method for UV irradiation, particularly for disinfection, of flowing liquids with reduced UV transmission in which an increased flow rate of the liquid is possible.

This is achieved in that the distance between the UV modules is selected in such a way that the cross-section of the irradiation chamber which is produced for each UV module at a module diameter of at least 28 mm is dimensioned in such a way that the average flow rate is greater than 0.25 m/s and the radiation output of the modules in the new state is at least 0.55 W UV per centimetre of discharge length.

The term high-performance low-pressure mercury radiator refers to radiators with a discharge length of at least 70 cm and a radiation output of more than 0.55 W per cm in the new state and at least 0.2 W/cm at the end of the service life and/or as the smallest control value. The term "irradiation chamber", which is produced for each UV module, will be explained in greater detail below.

BRIEF DESCRIPTION OF THE DRAWINGS

An embodiment of the present invention will be described below with the aid of the drawings in which:

FIG. 1 shows a diagrammatic perspective view of a UV device 10 with frames 12 which carry UV modules 14. Each UV module 14 comprises a high-performance low-pressure mercury radiator 26, which are not shown in the drawing, and each of which is surrounded by a sheathing tube in known manner. Only the sheathing tubes can be identified in the drawing.

Figure 1:
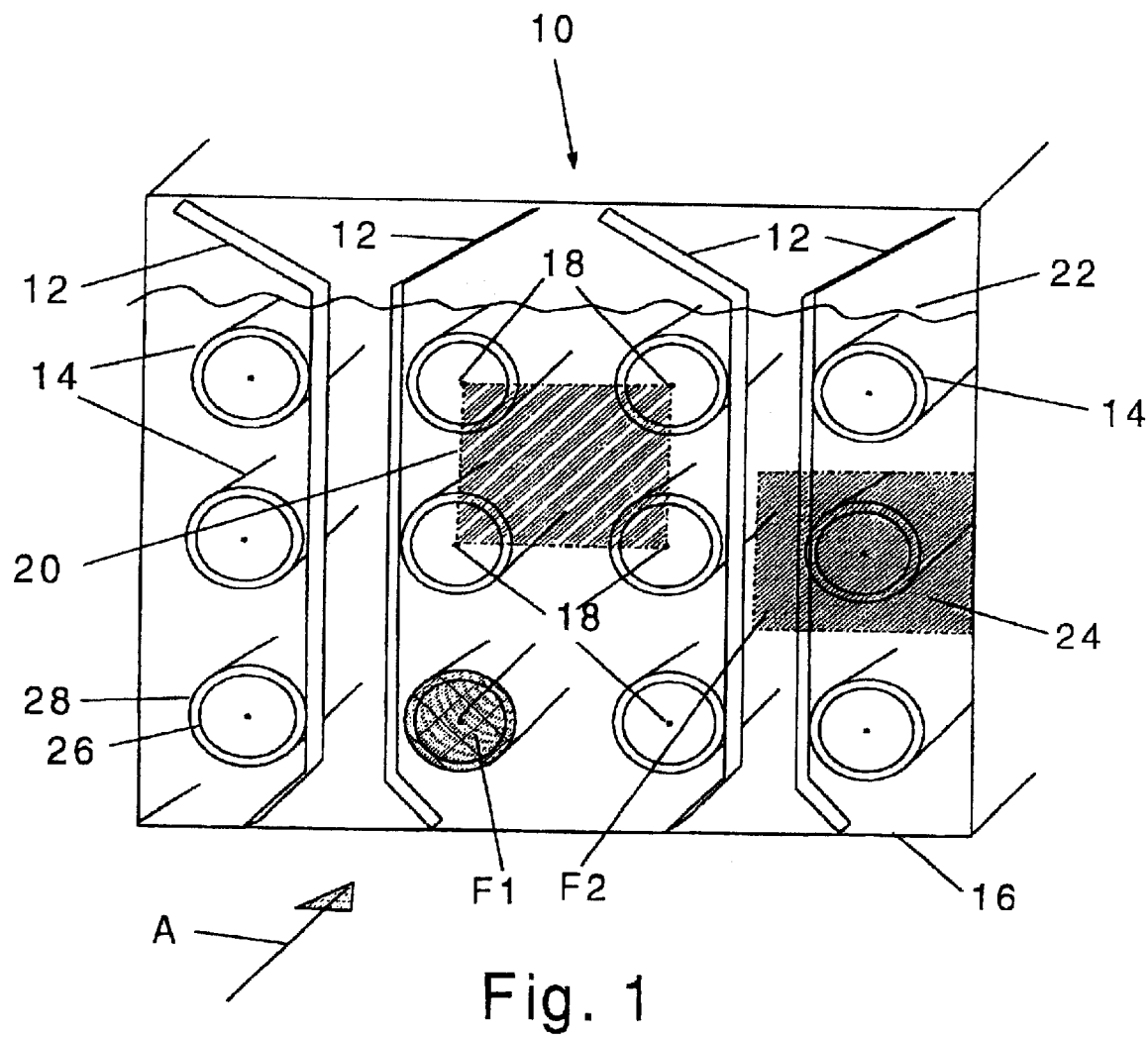
FIG. 1 shows a UV device according to the invention in a diagrammatic perspective view.

The device 10 is arranged in a channel not shown in greater detail, in which the waste water flows in the direction of the arrow A and which has a channel bottom 16. The UV modules which run horizontally are arranged so that their midpoints 18 form the corner points of an imaginary square 20. In the drawing all UV modules 14 are located in the waste water under the water surface 22.

To each UV module 14 is assigned an irradiation chamber 24 which is formed by a chamber imagined round a UV module 14 in which the UV module 14 is located as midpoint. In cross-section the irradiation chamber 24 is square in form and extends, starting from a UV module 14, as far as half the distance to the adjacent UV modules in each case and corresponds in its cross-sectional area to the cross-section of the imaginary square 20.

In the invention the distance between the UV modules 14 is selected in such a way that the cross-sectional area F2 of the irradiation chamber of each UV module 14 is not more than 10 times—particularly not more than 7.5 times—larger than the cross-sectional area F1 of the UV module 14 in question. F2 not greater than 10×F1 (and/or preferably F2 not greater than 7.5×F1) thus applies.

The high-performance low-pressure mercury radiators with their large radiation output generate a high radiation intensity of 30 mW/cm2 to not less than 60 mW/cm2 on the surface of the sheathing tube depending on the module diameter. Sheathing tubes with a comparatively large external diameter of at least 2.8 cm are used in this case. Despite the relatively large surfaces of the sheathing tubes, an increased radiation intensity is still achieved on the surface because of the high-performance low-pressure mercury radiators to which reference has been made.

In experiments it has surprisingly been shown that a substantially higher flow rate of the waste water is possible with the invention, and that distinctly larger quantities of waste water may be disinfected per unit of time, by which means the efficiency of the device according to the invention is improved up to many times over. As an appropriate embodiment of the invention the UV radiators 26 have an external diameter of approx. 20 mm to 40 mm, the annular gap between the UV radiators and the surrounding sheathing tube being at least 3.0 mm and preferably 4 to 6 mm.

As a further appropriate embodiment of the invention, amalgam-doped high-performance low-pressure mercury radiators are used to achieve a high radiation output. In an appropriate embodiment of the invention, to achieve high radiation outputs at high efficiencies these low-pressure radiators are operated with electronic ballasts such as are known from DE 196 37 906 A1 for example. Two or more low-pressure radiators may be operated with a joint electronic ballast.

Figure 2:
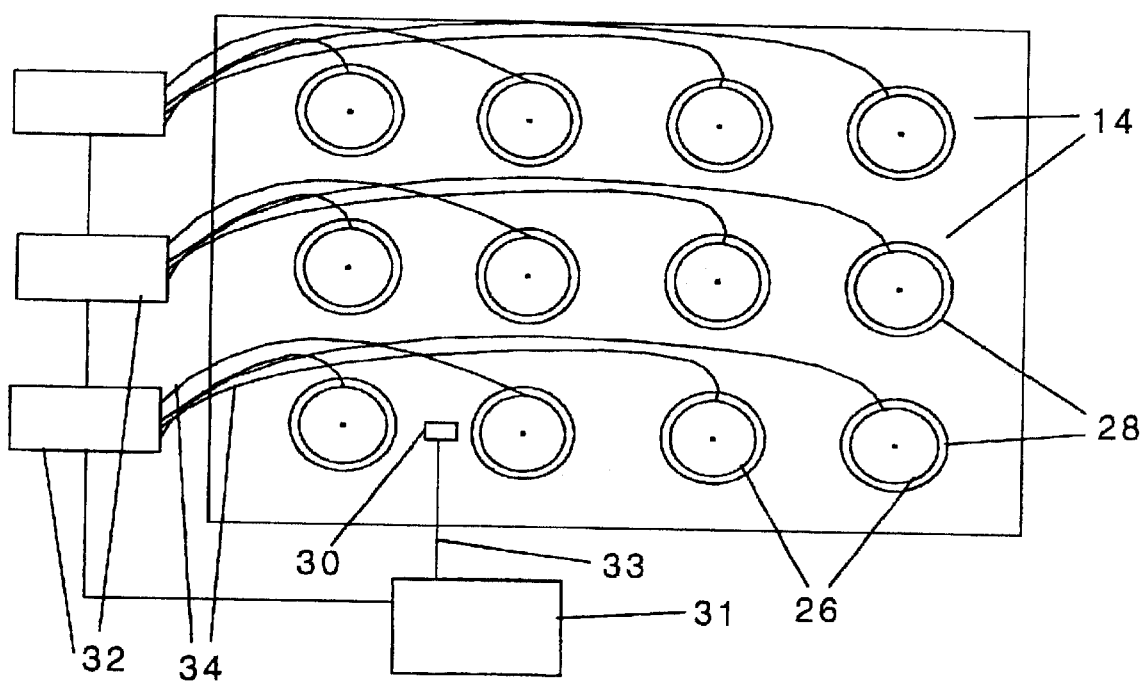
FIG. 2 shows an electrical circuit to control the UV radiators.

In this connection, in a diagrammatic view FIG. 2 shows an arrangement of radiator modules 14 corresponding to FIG. 1 with a radiation sensor 30, a control 31 and electronic ballasts 32, which are provided to control the UV radiators 26. The radiation sensor 30 measures the radiation intensity incident at a defined distance from the sheathing tube 28 in mW/cm2 and transfers the measured value via an electrical line 33 to the control 31 where the measured value is compared with the intended radiation intensity which is required for the installation to operate effectively. The electrical energy supplied to the radiators 26 via the electronic ballasts 32 is then controlled in such a way that substantially no more and no less than this optimum value of the radiation intensity is achieved.

A further advantage which this affords is a controllability of the radiators which makes it possible to set a rad ion output lower than the maximum possible intensity according to the transmission of the medium.

To increase the UV radiation output, amalgam-doped high-performance low-pressure-mercury-vapour radiators have been developed for controllable operation on electronic ballasts for the UV modules. Depending on their particular tube diameter in the sizes from 20 to 38 mm, UV emissions with outputs of 0.6 W to 1.4 W/cm of discharge length may be produced. It has only been possible hitherto to achieve these outputs approximately with special low-pressure mercury-vapour radiators with plug cooling under defined laboratory conditions. With the new radiation sources, irradiances on and/or above the sheathing tube which were not achievable hitherto are generated in practical operation without additional auxiliary devices, i.e. only with optimized annular gap dimensions between radiator tube and sheathing tube.

With the use of these new, more powerful UV radiation sources and their improved installation position (buffer zone) in the sheathing tube, UV modules are further produced which can beset to different temperatures of the medium in the range from 0° C. to 60° C. and whose UV emission can be steplessly controlled n the output range from 100% to 30% accompanied by consistently optimum efficiency.

In the method according to the invention the installation is initially configured in such a way that an average flow rate in excess of 0.25 m/s is set in normal operation, in normal operation being understood to mean an inflow in which the liquid level in the irradiation chamber is consistently above the uppermost radiator module. Furthermore, this method employs radiator modules of more than 30 mm external diameter with an output of at least 0.5 W UV per cm of radiator length (in the new state). In this way it is possible to achieve a turbulent flow with good intermixture which prevents the formation of non-irradiated regions (so-called dead water zones). Despite the relatively high flow rate, an effective radiation dose per unit of mass of the liquid is applied, because the radiation intensity is high and the UV absorption in the irradiation chamber relatively low because of the new geometrical ratios between module diameter and irradiation chamber cross-section. Finally, the method may also be used with very cold waste water just above freezing point because the air gap between the radiator and the sheathing tube provides heat insulation of the radiator. It does not cool down below its operating temperature. This behaviour cannot be achieved with module diameters below 30 mm.

The ageing process of low-pressure Hg radiators in the course of operation means that the above-mentioned radiation output of 0.5 W UV-C per centimetre of radiator length, for example, decreases, the energy absorbed remaining approximately the same. For the first time, therefore, the controllability of the UV radiators renders possible a configuration designed for reliable operation with sufficient efficiency at the end of the scheduled service life, i.e. guarantees adequate disinfection with 0.2 W UV-C per centimetre of discharge length for example. This radiation output can then be set with the control at the start of the service life. The electrical energy supplied is reduced by 60% for example for this purpose. As ageing increases, the radiation output can then be kept constant by increasing the energy supplied. This control may be effected via UV sensors which measure the radiation output actually supplied and adapt it to requirements via a control circuit.

The present configuration of radiators and sheathing tubes renders such a control possible for the first time, since the annular gap between the radiator and the sheathing tube, being at least 3.0 mm, is dimensioned so as to be large enough for the radiator not to cool down below the minimum operating temperature required of it even when energy consumption has decreased.

What is claimed is:

1. A method of UV irradiation for disinfection of flowing liquids, comprising the steps of:
   a. passing a liquid in the form of treated wastewater through an irradiation chamber comprising a plurality of UV modules each including a UV lamp controlled by an electrical input;
   b. measuring the UV radiation output of said UV modules; and,
   c. controlling the UV radiation output of said UV modules by adjusting the electrical input, in response to said measuring step b to maintain a constant UV radiation output over the operating life of said UV modules,
   wherein the electrical input to each of said UV lamps in said UV modules is controlled steplessly to maintain an optimized; constant UV radiation output by electrical input at a reduced value; at the beginning of the life of the modules and setting the electrical input at a reduced value continuously increasing the electrical input as the UV modules age thus extending the operating life of each of said lamps in said UV modules.

2. The method of claim 1 wherein said irradiation chamber consists of:
   at least one support frame;
   said plurality of UV modules each having a central axis, arranged parallel to one another such that said central axis is arranged parallel to the direction of the flow of the treated waste water, each UV module being in the form of a cylindrically shaped, low pressure UV mercury radiator surrounded by a sheathing tube permeable to UV rays wherein the gap between said UV mercury radiator and said sheathing tube is 3 mm, and the cross section of the irradiation chamber is large enough to maintain an average flow velocity of the liquid of more than 0.25 m/s for UV radiators with a diameter of at least 30 mm.

3. The method of claim 2 further comprising the step of:
   d. controlling the fluid flow velocity so that the average flow rate is greater than 0.4 m/s.

4. The method of claim 1 further comprising the step of:
   e. controlling said radiation output of the UV modules to be least 0.5 W/cm of the length of the UV radiators.

5. The method of claim 1 wherein said plurality of UV modules are mounted such that each UV module is associated with an irradiation volume of polygonal cross-section, the midpoint of which is the midpoint of the UV radiator and which, starting from the midpoint, extends half the distance to adjacent UV modules, the individual UV modules being arranged in such a way that the midpoints of the adjacent UV modules form the corner points of a polygon, the area of which corresponds to the sum of the cross-sectional area of a UV module and the cross-sectional area of the irradiation volume of a UV module, and the distance between the UV module is such that the cross section of the irradiation volume for each UV module is not more than 15 times larger than the cross-section of said UV module for diameters of 30 mm, not more than 12 times larger for module diameters of 45 mm and not more than 10 times larger for module diameters of 55 mm.

6. The method of claim 5 wherein said low pressure mercury radiators of the UV modules emit a radiation intensity of not less than 60 mW/cm$^2$ on said sheathing tube surface in the 200 nm to 280 nm UV range.

* * * * *